(12) United States Patent
Altmann (10) Patent No.: US 9,413,985 B2
(45) Date of Patent: Aug. 9, 2016

(54) COMBINING VIDEO AND AUDIO STREAMS UTILIZING PIXEL REPETITION BANDWIDTH

(75) Inventor: William Conrad Altmann, San Jose, CA (US)

(73) Assignee: Lattice Semiconductor Corporation, Portland, OR (US)

(*) Notice: Subject to any disclaimer, the term of this patent is extended or adjusted under 35 U.S.C. 154(b) by 414 days.

(21) Appl. No.: 13/611,786

(22) Filed: Sep. 12, 2012

(65) Prior Publication Data

US 2014/0071271 A1  Mar. 13, 2014

(51) Int. Cl.
| | | |
|---|---|---|
| *H04N 21/2365* | (2011.01) | |
| *H04N 7/12* | (2006.01) | |
| *H04N 5/268* | (2006.01) | |
| *H04N 7/18* | (2006.01) | |
| *H04N 13/00* | (2006.01) | |
| *H04N 21/482* | (2011.01) | |
| *H04N 13/02* | (2006.01) | |
| *H04N 7/01* | (2006.01) | |
| *H04N 21/81* | (2011.01) | |

(52) U.S. Cl.
CPC .............. *H04N 5/268* (2013.01); *H04N 7/181* (2013.01); *H04N 13/0048* (2013.01); *H04N 13/0242* (2013.01); *H04N 13/0296* (2013.01); *H04N 21/482* (2013.01); *H04N 7/01* (2013.01); *H04N 21/812* (2013.01)

(58) Field of Classification Search
CPC ............ H04N 13/0048; H04N 19/597; H04N 21/2365; H04N 21/4347; H04N 21/4316
USPC ............................................. 348/42–60, 143
See application file for complete search history.

(56) References Cited

U.S. PATENT DOCUMENTS

| | | |
|---|---|---|
| 4,517,669 A | 5/1985 | Freeburg et al. |
| 5,241,382 A | 8/1993 | Paik et al. |

(Continued)

FOREIGN PATENT DOCUMENTS

| | | |
|---|---|---|
| EP | 2228985 | 9/2010 |
| EP | 2362653 A1 | 8/2011 |

(Continued)

OTHER PUBLICATIONS

"CEA Standard, a DTV Profile for Uncompressed High Speed Digital Interfaces, CEA-861-D," Consumer Electronics Association, Jul. 2006, 176 pages.

(Continued)

*Primary Examiner* — Dave Czekaj
*Assistant Examiner* — Alison Slater
(74) *Attorney, Agent, or Firm* — Fenwick & West LLP (57) ABSTRACT

Embodiments of the invention are generally directed to combining multiple video and audio streams utilizing pixel repetition bandwidth. An embodiment of an apparatus includes a buffer to receive pixel data and a clock of a first video data stream; and a multiplexer to remove pixel repetition of a second video data stream and combine the pixel data of the first and second video data streams to generate a merged data stream, the multiplexer to alternate between the pixel data of the first and second video data streams in the merged data stream. The merged data stream includes pixel data of the first and second video data streams in a line of data, the line of data including control information identifying the pixel data of the first and second video data streams.

33 Claims, 9 Drawing Sheets

(56) References Cited

U.S. PATENT DOCUMENTS

| | | | |
|---|---|---|---|
| 5,541,662 A | 7/1996 | Adams et al. | |
| 6,141,691 A | 10/2000 | Frink et al. | |
| 6,191,822 B1 | 2/2001 | Smyers | |
| 6,914,637 B1* | 7/2005 | Wolf et al. | 348/473 |
| 7,076,652 B2 | 7/2006 | Ginter et al. | |
| 7,117,003 B2 | 10/2006 | Kayama et al. | |
| 7,162,642 B2 | 1/2007 | Schumann et al. | |
| 7,558,537 B2 | 7/2009 | Trachewsky et al. | |
| 7,912,095 B2 | 3/2011 | Zeng et al. | |
| 8,189,681 B1* | 5/2012 | Thiffault | G06F 3/14 375/240.25 |
| 2002/0021261 A1 | 2/2002 | Werner | |
| 2003/0159143 A1* | 8/2003 | Chan | H04N 5/45 725/41 |
| 2005/0144468 A1 | 6/2005 | Northcutt et al. | |
| 2006/0031895 A1* | 2/2006 | Kwon | G09G 5/006 725/100 |
| 2006/0139463 A1* | 6/2006 | Heinonen | H04N 5/2251 348/239 |
| 2006/0269060 A1 | 11/2006 | Candelore et al. | |
| 2007/0009232 A1 | 1/2007 | Muraki et al. | |
| 2007/0056000 A1 | 3/2007 | Pantalone et al. | |
| 2007/0118864 A1 | 5/2007 | Champion et al. | |
| 2007/0133797 A1 | 6/2007 | Schipper et al. | |
| 2007/0162981 A1 | 7/2007 | Morioka et al. | |
| 2007/0286243 A1 | 12/2007 | Olshansky et al. | |
| 2008/0060034 A1* | 3/2008 | Egnal | G01C 11/02 725/105 |
| 2008/0165275 A1* | 7/2008 | Jones et al. | 348/446 |
| 2009/0060182 A1 | 3/2009 | Killian et al. | |
| 2009/0168812 A1* | 7/2009 | Crookes et al. | 370/537 |
| 2009/0248924 A1* | 10/2009 | Melin | 710/63 |
| 2009/0316889 A1 | 12/2009 | MacDonald et al. | |
| 2010/0027604 A1 | 2/2010 | Vaidyanathan et al. | |
| 2010/0118927 A1 | 5/2010 | Ichimura et al. | |
| 2010/0287609 A1 | 11/2010 | Gonzalez et al. | |
| 2011/0038408 A1* | 2/2011 | Jacob | H04N 21/2343 375/240.01 |
| 2011/0088056 A1 | 4/2011 | Ansari | |
| 2011/0119709 A1 | 5/2011 | Kim et al. | |
| 2011/0134862 A1 | 6/2011 | Huang et al. | |
| 2011/0149032 A1 | 6/2011 | Choi et al. | |
| 2011/0157473 A1* | 6/2011 | Choi | H04N 5/765 348/566 |
| 2011/0193966 A1* | 8/2011 | Golan et al. | 348/159 |
| 2011/0211639 A1* | 9/2011 | Jones | H04N 19/30 375/240.16 |
| 2012/0019619 A1* | 1/2012 | Suh et al. | 348/43 |
| 2012/0020413 A1* | 1/2012 | Chen | H04N 19/597 375/240.26 |
| 2012/0020475 A1 | 1/2012 | Altmann | |
| 2012/0044324 A1* | 2/2012 | Lee et al. | 348/43 |
| 2012/0076296 A1 | 3/2012 | Graunke | |
| 2012/0092450 A1* | 4/2012 | Choi et al. | 348/43 |
| 2012/0133736 A1* | 5/2012 | Nishi et al. | 348/43 |
| 2013/0089202 A1 | 4/2013 | Altmann | |
| 2014/0354884 A1* | 12/2014 | Suzuki | G09G 5/003 348/478 |

FOREIGN PATENT DOCUMENTS

| | | |
|---|---|---|
| EP | 2389765 A1 | 11/2011 |
| KR | 10-2000-0060590 | 10/2000 |
| KR | 10-2001-0062821 | 7/2001 |
| KR | 10-2012-0069795 | 6/2012 |

OTHER PUBLICATIONS

"High-Definition Multimedia Interface Specification Version 1.3," HDMI Licensing LLC, Jun. 22, 2006, 237 pages.

High-bandwidth Digital Content Protection System Interface Independent Adaptation Specification Revision 2.0, Digital Content Protection LLC, Oct. 23, 2008.

International Search Report and Written Opinion of the International Searching Authority dated Jan. 31, 2013, in International Patent Application No. PCT/US2012/050334, 7 pages.

International Search Report and Written Opinion of the International Searching Authority dated Nov. 22, 2013, in International Patent Application No. PCT/US2013/051538, 13 pages.

International Search Report dated Feb. 9, 2012, in International Patent Application No. PCT/US2011/044518, 3 pages.

Office Action mailed Jan. 30, 2013, in U.S. Appl. No. 13/269,450, 34 pages.

Office Action mailed Sep. 9, 2013, in U.S. Appl. No. 13/269,450, 38 pages.

Written Opinion of the International Searching Authority completed Jan. 20, 2012, in International Patent Application No. PCT/US2011/044518, 3 pages.

European Extended Search Report, European Application No. 13837991.2, Jun. 1, 2016, 9 pages.

* cited by examiner

COMBINING VIDEO AND AUDIO STREAMS UTILIZING PIXEL REPETITION BANDWIDTH

TECHNICAL FIELD

Embodiments of the invention generally relate to the field of data transmission, and, more particularly, to combining multiple video and audio streams utilizing pixel repetition bandwidth.

BACKGROUND

In the transmission of signals between devices or elements, such as the transmission of audio-visual data streams, certain technologies may require the transmission of multiple different types of data streams. For example, consumer electronics and other systems may transmit and receive one or more video streams and one or more other data streams within a single encoded interconnect.

Consumer electronic devices and systems and other systems may transmit and receive streams of content that contain one or more video streams and one or more data streams, such as within one encoded interconnect. The receiving side of this connection is then required to distinguish one video content stream from another, and one data stream from another, in order to properly render the various content streams into useable form, such as displayed video, rendered audio, and other data uses.

Conventional systems may utilize specific packets, such as InfoFrames defined in CEA-861 and standards such as HDMI™ (High Definition Multimedia Interface) and MHL™ (Mobile High-definition Link), to identify video content streams and data content streams. Further, standards such as HDMI and MHL have further included coded characters such are guard bands and preambles preceding or following video content or data content to distinguish between such types of content.

However, these existing approaches are limited in certain ways. First, the approaches provide no means of distinguishing among multiple video content streams or multiple data streams, because they cover only interconnects that carry a single video stream and a single data stream. Second, the existing approaches do not mark each part of a video stream with a content identifier, but rather send the InfoFrame packet only once per frame. Third, if a video content stream is encrypted with HDCP (High-bandwidth Digital Content Protection), then some of the identifying markers are also encrypted, preventing the encoded content identifiers from being modified when translating from one standard (such as MHL) to another standard (such as HDMI) without first decrypting the stream and then re-encrypting the stream after modification of the content markers.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Embodiments of the invention are generally directed to combining multiple video and audio streams utilizing pixel repetition bandwidth.

In a first aspect of the invention, an embodiment of an apparatus includes a buffer to receive pixel data of a first video data stream and a clock of the first video data stream; and a multiplexer to remove pixel repetition of a second video data stream and combine the pixel data of the first video data stream with pixel data of the second video data stream to generate a merged data stream, the multiplexer to alternate between the pixel data of the first video data stream and the pixel data of the second video data stream in the merged data stream. The merged data stream includes pixel data of the first video data stream and pixel data of the second video data stream in a line of data, the line of data including control information identifying the pixel data of the first video data stream and the pixel data of the second video data stream.

In a second aspect of the invention, an embodiment of method includes storing pixel data and a clock of a first video data stream in a buffer; removing pixel repetition of a second video data stream; and generating a merged data stream by combining the pixel data of the first video data stream with pixel data of the second video data stream. Generating the merged data stream includes alternating between the pixel data of the first video data stream and the pixel data of the second video data stream in the merged data stream, and includes placing pixel data of the first video data stream and pixel data of the second video data stream in a single line of data, a control structure identifying the pixel data of the first video data stream and the pixel data of the second video data stream.

In a third aspect of the invention, an embodiment of an apparatus includes a receiver to receive a merged data stream, the merged data stream including pixel data of multiple video data streams in a line of data, the merged data stream alternating between the pixel data of each of the video data streams, wherein a control structure in the merged data stream identifies positions of the pixel data of each of the video data streams in a line of data; and a processor to separate pixel data of the merged data stream into corresponding data streams based at least in part on the identified positions of each pixel data of each of the video data streams in a line of data.

In a fourth aspect of the invention, an embodiment of a method includes receiving a merged data stream, the merged data stream including pixel data of multiple video data streams in a line of data, the merged data stream alternating between the pixel data of each of the video data streams, wherein a control structure in the merged data stream identifies positions of the pixel data of each of the video data streams in a line of data; and separating pixel data of the merged data stream into corresponding video data streams based at least in part on the identified positions of each pixel data of each of the video data streams in a line of data.

DETAILED DESCRIPTION

Embodiments of the invention are generally directed to combining multiple video and audio streams utilizing pixel repetition bandwidth.

In some embodiments, a method, apparatus, or system provides for combining multiple video data streams utilizing pixel repetition bandwidth, where a video data stream may include additional data such as audio data. In some embodiments, a mechanism is provided for combining multiple video data streams into a single stream, the single stream then being transferred from a transmitter to a receiver, where the merged stream may be split into the original individual data streams.

Pixel repetition, as defined in specifications such as HDMI and MHL, is used to send video data with a faster clock so that there are sufficient clock cycles in the non-video time to carry the necessary audio content. This mechanism, however, sends each pixel value in the original stream more than one time. For example, a 480 p/60 stream has 720 pixels per line. In a 2× repetition mode, each of the pixels is sent two times, for a total of 1440 data values per video line. The second repetition (in this example) conveys no new information.

In some embodiments, an apparatus, system, or method provides for re-timing the pixel repeated data of a first video data stream to recover the wasted space created by pixel repetition. In some embodiments, content from a second video data stream is then inserted into the recovered space of the first stream to generate a merged stream. In some embodiments, when used in combination with multi-valued preambles, such as described in U.S. patent application Ser. No. 13/269,450 (Identification and Handling of Data Streams Using Coded Preambles), two video data periods may be created from one pixel repeated video data period.

In some embodiments, an apparatus, system, or method handles data such as data islands (where data island data includes audio data packets and auxiliary data, such as InfoFrames or other constructs, and occurs during the horizontal and vertical blanking intervals) by shifting the timing of the data islands from a primary stream (a first stream) in the non-video data period time to create space for the data islands from a secondary stream (a second stream). Using a unique preamble for the primary and secondary streams' data island content, the transmitter may then flag these data islands separately. In some embodiments, a receiver equipped to recognize multiple preamble values separates data islands back into separate streams, and separates the video data periods back into the corresponding separate streams.

In some embodiments, in a case of a primary stream and a secondary stream using the same video mode, with only the primary stream carrying audio, the task of the transmitter may be simplified. Under such circumstances, the transmitter is not required to copy the data islands from the secondary stream, but rather is required only to transmit data islands from the primary stream. In this example, no additional bandwidth is needed for combining data islands. In some embodiments, for the combination of a primary stream and a secondary stream using the same video mode, with only the primary stream carrying audio, AVI (Auxiliary Video Information), Audio, and other InfoFrames, as well as other control packets such as ACP, may be discarded from the incoming secondary stream, and then re-inserted in the appropriate place by the receiver when it reconstructs a complete secondary stream for its receiver output.

In an example, a 480 p/60 video data stream includes repeated pixel values, such as "P1P1P2P2P3P3P4P4" indicating a repeated first pixel, followed by a repeated second pixel, and so on. However, only one copy of each stream's pixel data needs to be inserted in the combined stream. In some embodiments, instead of one stream with "P1P1P2P2P3P3P4P4", the stream becomes "P1Q1P2Q2P3Q3P4Q4", for streams 'P' and 'Q'. In some embodiments, coded characters, such as guard bands and preambles, are not replicated. For example, only one copy of each guard band and preamble are sent at the beginning or end of each active video data period. In some embodiments, the data islands (if there are data islands from both streams and the content is different) are combined in the available blanking time through buffering with FIFOs (or similar elements).

While this example and other examples in this description generally refer to the alternation of pixels in a combined stream, embodiments are not limited to alternation between individual pixels, and may, for example, include alternation between groups of pixels. In a first example, an implementation may include a 4× pixel repetition that is converted to alternation between 2× repeated pixels, such as combining a first video data stream including "P1P1P1P1P2P2P2P2" with a second video data stream to generate a merged stream providing "P1P1Q1Q1P2P2Q2Q2". In a second example, an implementation may include a 2× pixel repetition that is converted to alternation between pixel groups for each video data stream, such as combining a first video data stream including "P1P1P2P2P3P3P4P4" with a second video data stream to generate a merged stream providing "P1P2Q1Q2P3P4Q3Q4".

In some embodiments, by encoding unique preambles for the primary and secondary streams, content may be divided back into two streams without, for example, decoding back to 24-bit values. In some embodiments, a system may provide for re-calculating DC balancing of TMDS characters as needed. In some embodiments, a vertical sync is not transmitted across a link. For example, the first line of a primary stream's frame may be transmitted (with, for example, a 'first line'+'primary stream' preamble), followed immediately by line 'N' of the secondary stream's frame (with a 'non-first line'+'secondary stream' preamble), and so on, without regard to matching up first or last elements or any frame orientation between the primary and secondary streams.

In some embodiments, because the vertical sync timings of the primary and secondary streams may not match, and further the clock frequencies from multiple input sources may not match, arriving content is delayed in order to horizontally synchronize it into the available space. In some embodiments, delay is provided with elements such as line buffers or other delay elements. In some embodiments, a system or apparatus operates without complete synchronization of streams with regard to vertical sync, where an apparatus or system allows for unique preamble coding for the first or last video data period of each particular frame, such that the receiver can identify the first (or last) line of each frame in each stream. In some embodiments, with this information, the receiver can re-insert the vertical sync pulses when the receiver re-formats the individual streams for its receiver output.

While the examples provided here generally refer to two streams for ease of explanation, embodiments are not limited to any particular number of data streams. In some embodiments, an apparatus, system or method may be expanded to N streams, where N is limited only by the bandwidth that can be freed by recovering repeated pixel data. In an example, four 480 p/60 streams that have no audio (and thus do not inherently need pixel repetition) may be sent using 4× repetition, with the video data periods for the four stream alternating in sequence in sequence in the video data period of each line of data through the transmitter, and recovered in the receiver, all using a link clock of four times 27 MHz, or 108 MHz. In some embodiments, the pixel data alternates within each video data period, and thus preambles and guard bands do not need to be replicated.

In some embodiments, applications for embodiments may include:

(1) Surveillance equipment: In some embodiments, an apparatus or system combines the video streams from multiple cameras into one TMDS stream, sending the combined stream across a wired or wireless link, wherein the combined streams are split into separate streams at the receiver side for display, analysis or storage.

(2) Multiple-display setups: In some embodiments, a single source generates a single large image, encodes the large image into separate streams for multiple screens, and sends the streams across a link in combined form including use of preamble encoding to identify the video data. In some embodiments, the combined stream at the far end is separated into streams for each of the displays. In some embodiments, an apparatus or system provides for desktop setups with multiple monitors, for "video walls" where multiple displays are tiled together, or for advertising where several displays may be positioned separately but carry images originating from one source.

(3) Video switchers: In some embodiments, combining concepts from the surveillance equipment and multiple display examples, a transmitting apparatus or system operates as a switch, combining multiple streams and transporting the combined multiple over a single line, while an embodiment of a receiving apparatus or system operates to split the combined streams apart. In some embodiments, the switch may select the preamble codes according to the destination or the originator's identity.

(4) Separate Video and Audio: In some embodiments, an apparatus or system provides for combining a video data stream with an audio data stream originating in a different system. In this example, the audio stream may be carried into the transmitter on a "video clock carrier" (a blank screen), and then combined with the video stream in the transmitter. In some embodiments, a receiver operates to split the video data stream and the audio data stream apart again. In some embodiments, the video and audio might originate in one system, but be targeted to separate rendering systems, such as a first rendering system for the audio and a second rendering system for video. In some embodiments, these streams are conveyed in their encoded form up to the point of decoding the streams in the individual receivers.

In some embodiments, an apparatus or system may provide for distinguishing video data streams from within one combined stream, such as a stream of left-eye frames and a stream of right-eye frames all within one 3D video data stream. In some embodiments, the apparatus or system may separate the video data streams, and present or otherwise utilize the separated video data streams.

In some embodiments, multiple applications may be implemented using the bandwidth of pixel repetition without creating an encoded stream that is incompatible with HDMI-based or MHL-based transport links. In an example, a multiple camera systems may utilize combined data streams.

Figure 1:
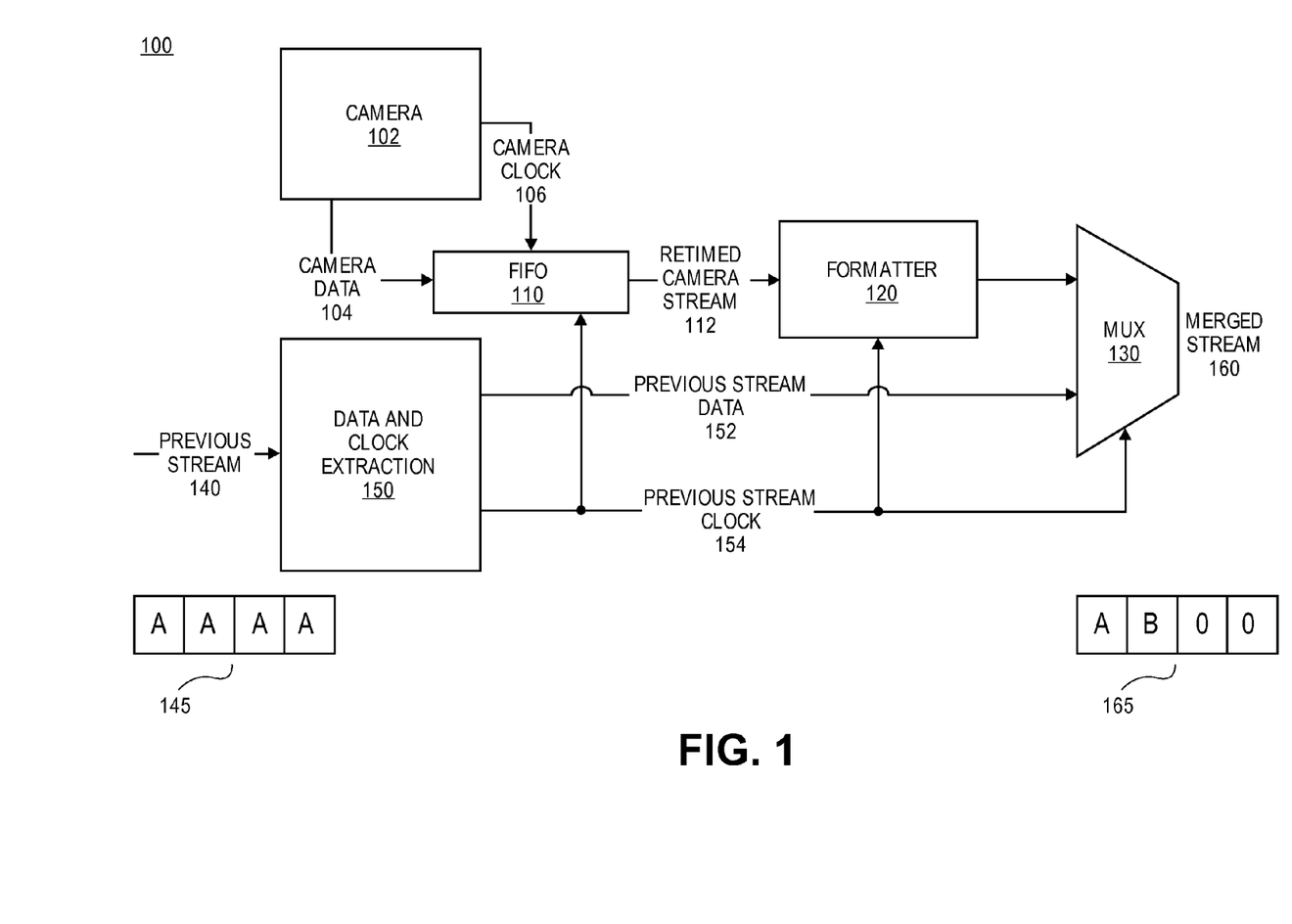
FIG. 1 is an illustration of an embodiment of an apparatus or system for combining video data streams using pixel repetition bandwidth.

FIG. 1 is an illustration of an embodiment of an apparatus or system for combining video data streams using pixel repetition bandwidth. In this illustration, camera data is combined with a previous stream to generate a merged stream. In some embodiments, an apparatus or system generates a single camera output and receives a previous stream of video, and creates a combined stream of the camera video and the received video using pixel repetition bandwidth. In some embodiments, the combined stream includes alternating pixel data from the video data streams in a single video period of a line of data, with the combined stream thus not requiring separate guard bands and preambles for each data stream.

In this illustration, an apparatus or system 100 includes a camera 102, where the camera provides a camera data output (video data) 104 and a camera clock output 106, where such outputs are provided to a FIFO (First In First Out) memory or other memory element, which is generally referred to herein as FIFO 110. In some embodiments, the apparatus or system 100 further receives a previous data stream 140, wherein the previous data stream may be provided to a data and clock extraction element 150 to generate previous stream data 152 and a previous stream clock 154, where the previous stream clock is received by the FIFO 110 to generate a re-timed camera stream 112.

In some embodiments, the camera video is clocked into the FIFO 110 using the camera clock 106. The apparatus or system 100 clocks the video data out of the FIFO 110 using the previous stream clock 154, which may be extracted from the incoming previous stream. The re-timed data 112 is then formatted (such as into TMDS characters) and multiplexed into the proper positions in the pixel repetition video stream. In this illustration, the re-timed camera stream is provided to a formatter 120, which also receives the previous stream clock 154 to generate a reformatted and retimed camera stream clocked by the previous stream clock 154. In some embodiments, a multiplexer (mux) 130 receives the reformatted and retimed camera stream and the previous stream data 152, where the data from each is alternatively chosen by the previous stream clock 154 to generate a merged stream 160. As illustrated, the repeated pixels (designated as 'A') of the previous stream 145 (A-A-A-A) are replaced by the previous stream data alternating with the camera data ('B') in the data of the merged stream 165 (A-B-0-0). In some embodiments, what was a single stream of pixel repeated 'A' data becomes a single stream with 'A' data and 'B' data. In some embodiments, the remaining pixel repeated periods are filled with zeros, where such zero space may be utilized for merging additional streams.

In some embodiments, control packets may be modified to indicate the nature of the merged stream. For example, an AVI InfoFrame (or other control packet) is modified to mark that two periods in the pixel repeated format are filled with 'A' data in a first period, and 'B' data in a second period, and no data in the third and fourth periods.

An incoming previous stream may not be in a pixel repeated format. In some embodiments, pixel repetition may be performed by the formatter 120 shown in FIG. 1. In this example, the pixel repetition may not be in 4× pixel repeated format. For example, the output stream may be a 2× repeated stream instead of a 4× repeated stream, with no unused "third and fourth periods". In some embodiments, a modification from non-repeated to repeated formatting utilizes a change to the AVI InfoFrame.

Figure 2:
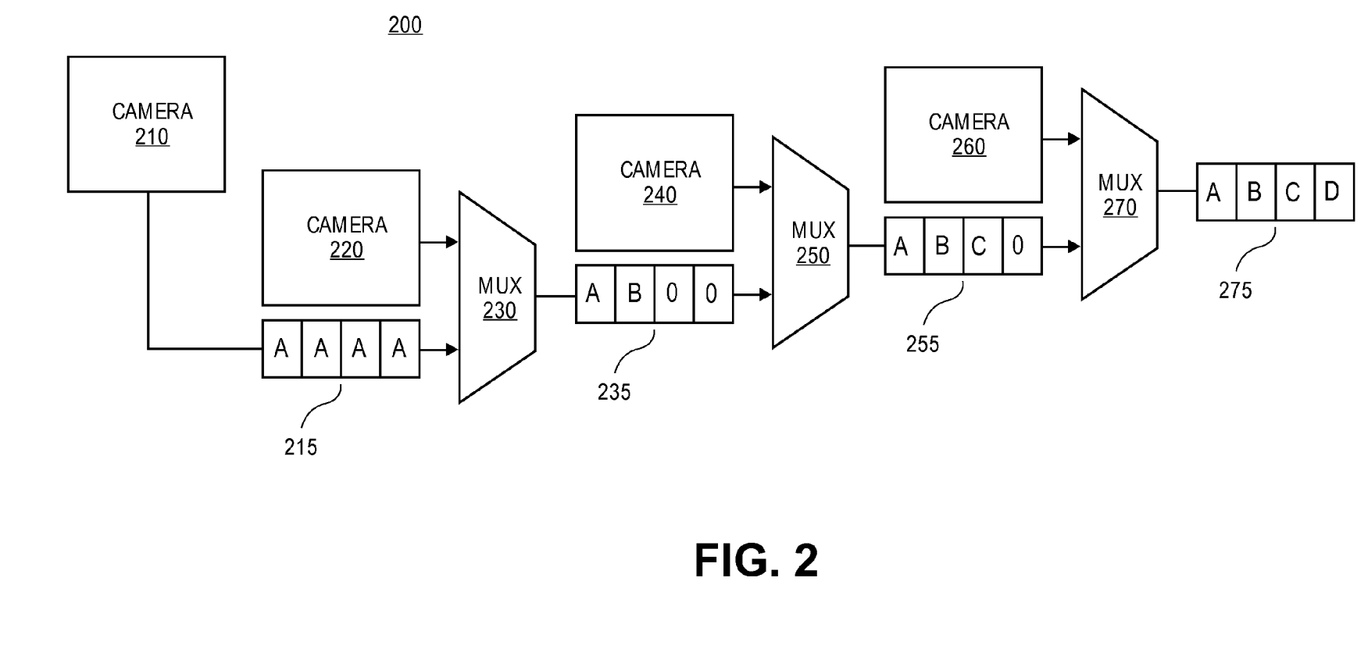
FIG. 2 is an illustration of an embodiment of a system or apparatus merging multiple stages of video using pixel repetition bandwidth.

FIG. 2 is an illustration of an embodiment of a system or apparatus merging multiple stages of video using pixel repetition bandwidth. In FIG. 2, a system or apparatus 200 includes multiple stages of cameras and merging logic that are utilized to create a single stream with data from four cameras using 4× pixel repetition. In this illustration, each stage uses the process illustrated in FIG. 1 and described above. For clarity in illustration, all elements of the stages are not provided in FIG. 2.

In FIG. 2, a first camera may produce a video 215 in 4× pixel repeated format, shown as 'A' data repeated four times. Uses the elements illustrated in FIG. 1, the data and clock of video 215 may be extracted and the video merged with video of a second camera 220, with first mux 230 alternating the data to produce first merged stream 235, shown as 'A' data in a first position, 'B' data from the camera 220 in a second position, and zero (or null) data in third and fourth positions.

In a next stage, data from a third camera 240 is merged with the first merged stream 235 using second mux 250 to generate a second merged stream 255, with 'A' data in the first position, 'B' data in the second position, 'C' data from the third clock 240 in the third position, and zero data in the fourth position.

In a last stage, data from a fourth camera 260 is merged with the second merged stream 255 using third mux 270 to generate a third and final merged stream 275, with 'A' data in the first position, 'B' data in the second position, 'C' data in the third position, and 'D' data from the fourth camera 260 in the fourth position.

While this example includes the insertion of pixel data in all positions of the video data, embodiments are not limited to this implementation. In an example, the camera 260 may not be present, or the mux 270 may exclude data from camera 260 such that at least one of the positions of the video data for the merged data stream does not include content data, but instead includes zero or null data. In some embodiments, an InfoFrame may include an indication that a position includes zero data, and a receiving device may operate to ignore the zero data when separating the merged data streams.

In some embodiments, a system such as the system described above for multiple independent cameras may also be used for sending stereo (3D) streams through a single cable. The two streams may be multiplexed into one video data period, line by line, and sent across a conventional HDMI- or MHL-based link.

Figure 3:
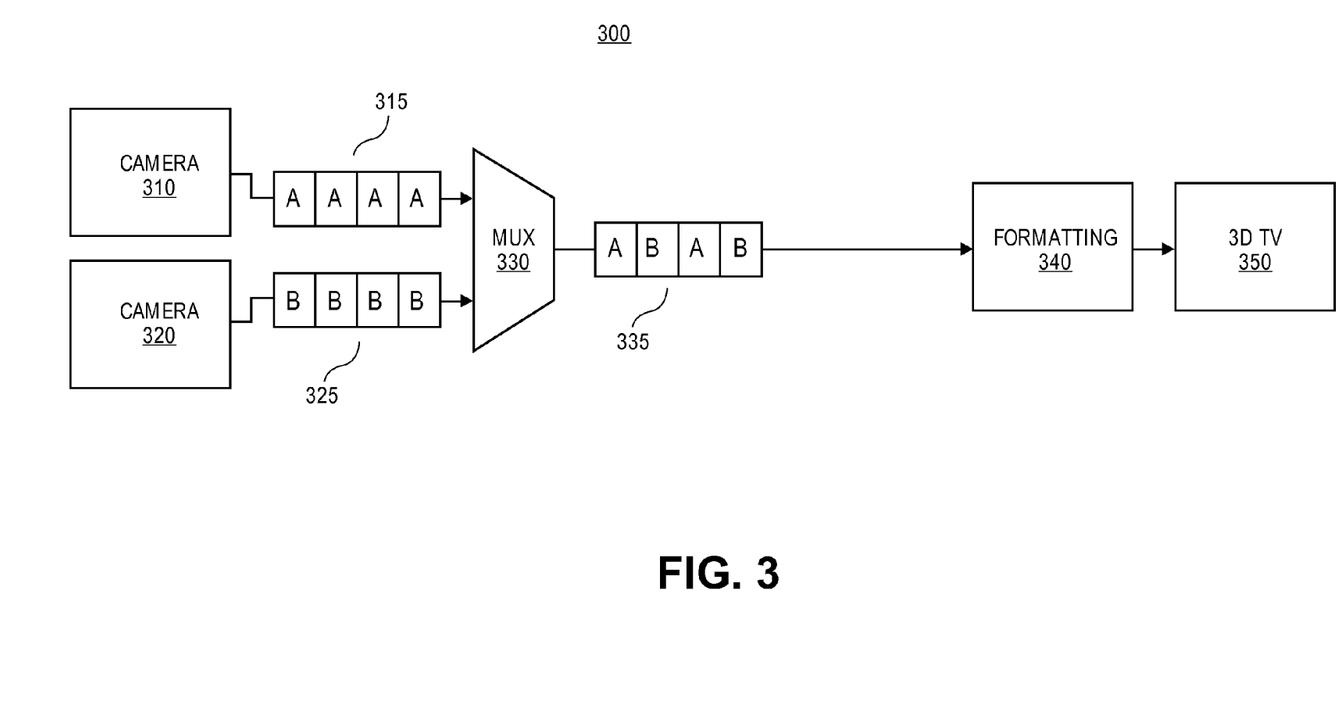
FIG. 3 is an illustration of an apparatus or system for the merger of channels of a 3D video data stream.

FIG. 3 is an illustration of an apparatus or system for the merger of channels of a 3D video data stream. In some embodiments, a first camera 310 may generate a first data stream 315, such as either a left or right 3D video channel, shown as data 'A'. A second camera 320 may generate a second data stream 325, such as the other of a left or right 3D video channel, shown as data 'B', where both data streams are 4× pixel repeated. Using elements illustrated in FIG. 1, first data stream 315 and second data stream 325 are merged using the pixel repetition, mux 330 alternating the pixel data to generate merged data stream 335, which provides a 2× pixel repetition of the A-B data. In some embodiments, the merged data stream may be received for formatting 340 and presentation on a 3D television display 350.

In this illustration, the data may be post-processed in the display. Intermediate systems, such as A/V Receivers may accept this stereo stream as HDMI or MHL, render audio, and then send the stereo stream on to the display unit, without knowing that the video data period is not conventional 2× pixel repetition.

In some embodiments, an apparatus, system, or method provides for merger of video data streams without requiring repeated control structures. In some embodiments, the apparatus, system, or method utilizes the bandwidth of a pixel repeated stream without adding control structures such as guard band characters, preamble characters, and InfoFrames.

In some embodiments, a merged stream, although carrying pixel data from different sources, is still compatible with HDMI or other format for transmission. The merged stream may not be fully compliant with a format because, for example, HDMI does not define carrying multiple streams and requires all repetitions of a pixel to be identical pixel data, but the merged stream can pass through an HDMI switch without modification. Further, there are no repeated and differing AVI InfoFrames or other InfoFrames.

In some embodiments, a merged stream may be easily de-multiplexed back into multiple ordinary HDMI streams. This allows multiple cameras to combine their streams, send the combined streams along one cable, and then display those streams individually on multiple screens.

Figure 4:
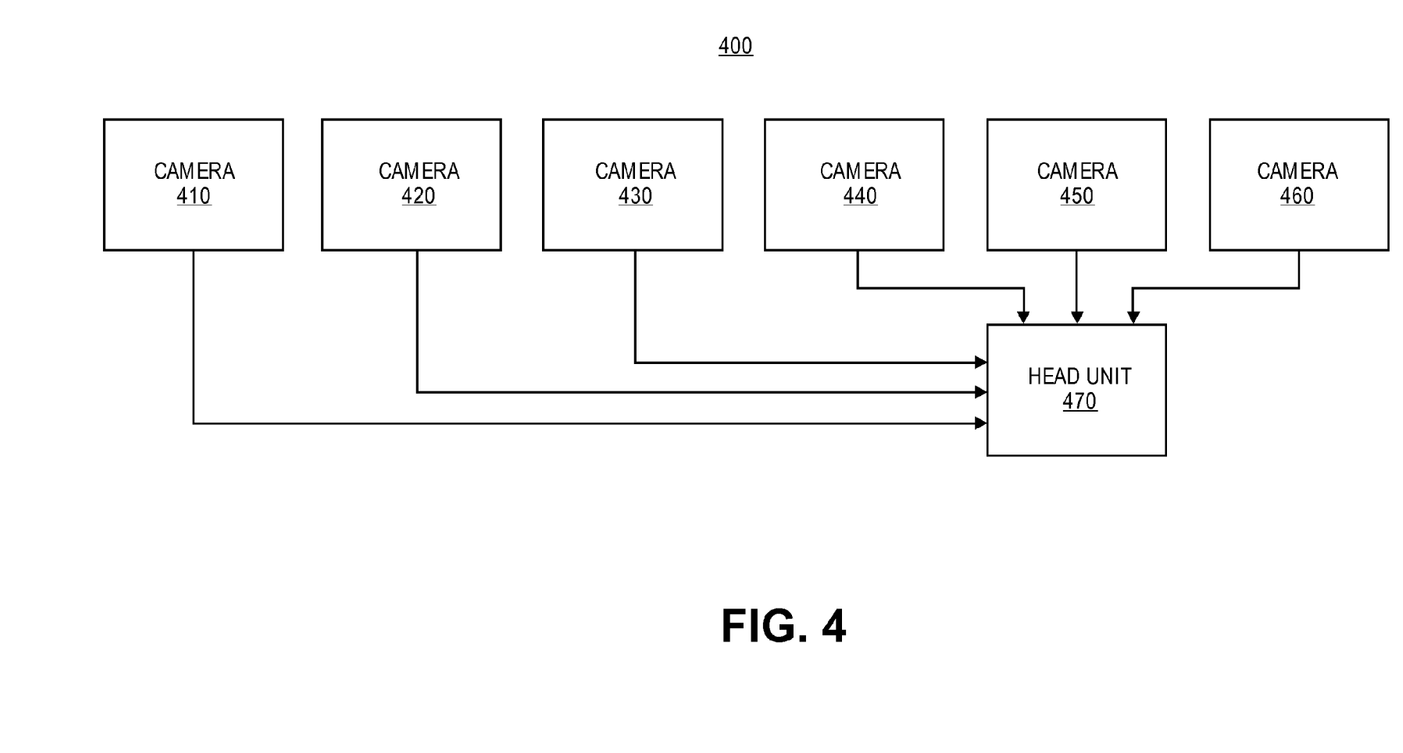
FIG. 4 illustrates an embodiment of a system or apparatus for combining video of multiple cameras.

FIG. 4 illustrates an embodiment of a system or apparatus for combining video of multiple cameras. The data of multiple cameras, such as a set of the illustrated cameras 410-460, may be received at a head unit 470. In some embodiments, the head unit 470 may include elements illustrated in FIGS. 1 and 2 for the merger of data streams into a single data stream.

Figure 5:
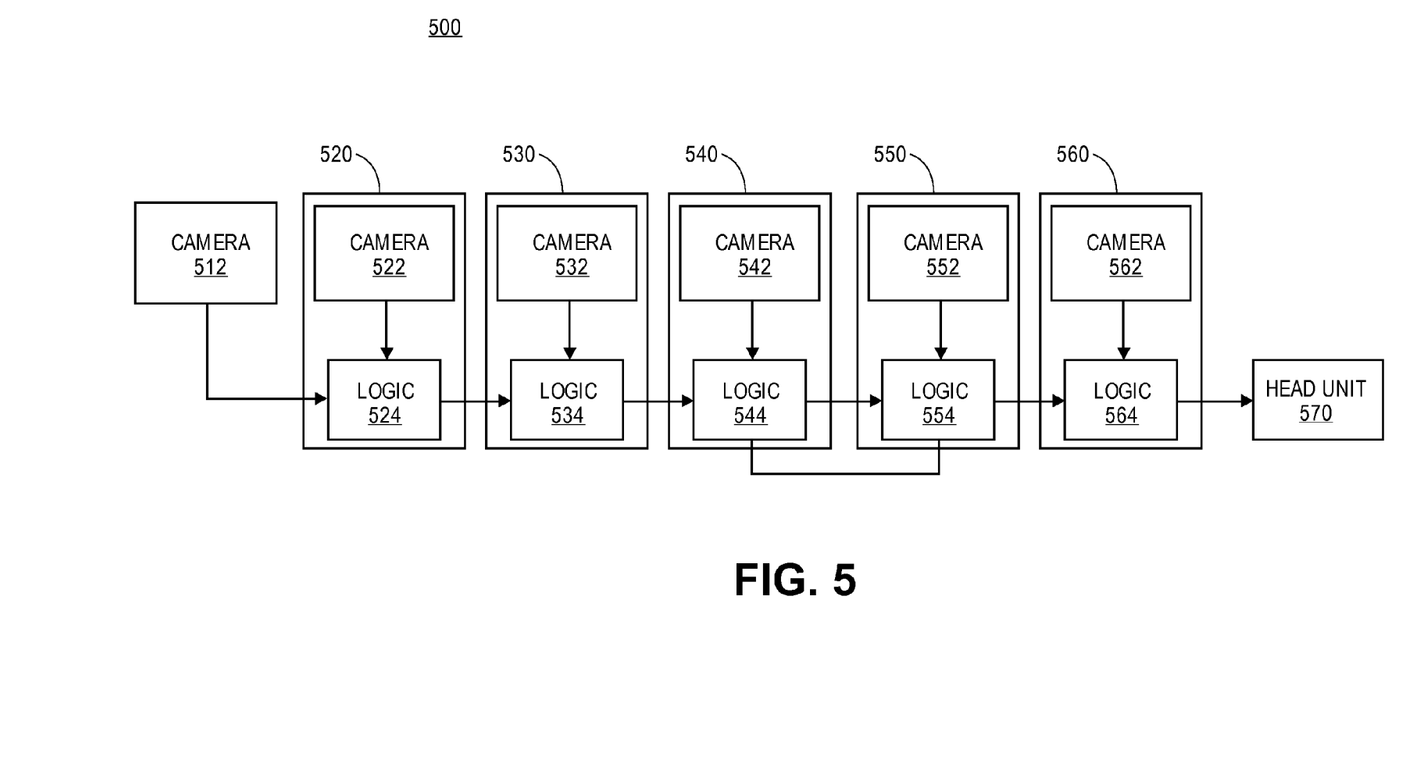
FIG. 5 illustrates an apparatus or system for combining video data using a single cable.

While FIG. 4 illustrates a particular implementation with separate cables between each camera and the head unit 470, embodiments are not limited to this structure. Rather than configured as a star, with a separate cable from each camera to the head unit (as shown in FIG. 4), a system may include a single cable. FIG. 5 illustrates an apparatus or system for combining video data using a single cable. In this illustration, a system 500 includes a series of stages following a single cable. As illustrated, a first camera 512 may provide data to a first stage 520 including camera 522 and merging logic 524, where merging logic 524 provides for the merging of data of camera 512 and camera 522 using the elements shown in FIG. 1 and described above. Additional stages may provide for additional merging of data, such as a second stage 530 including camera 532 and merging logic 534, a third stage 540 including camera 542 and merging logic 544, a fourth stage 550 including camera 552 and merging logic 554, and a fifth stage 560 including camera 562 and merging logic 564, with the fifth stage 560 being coupled with a head unit 570.

Figure 6:
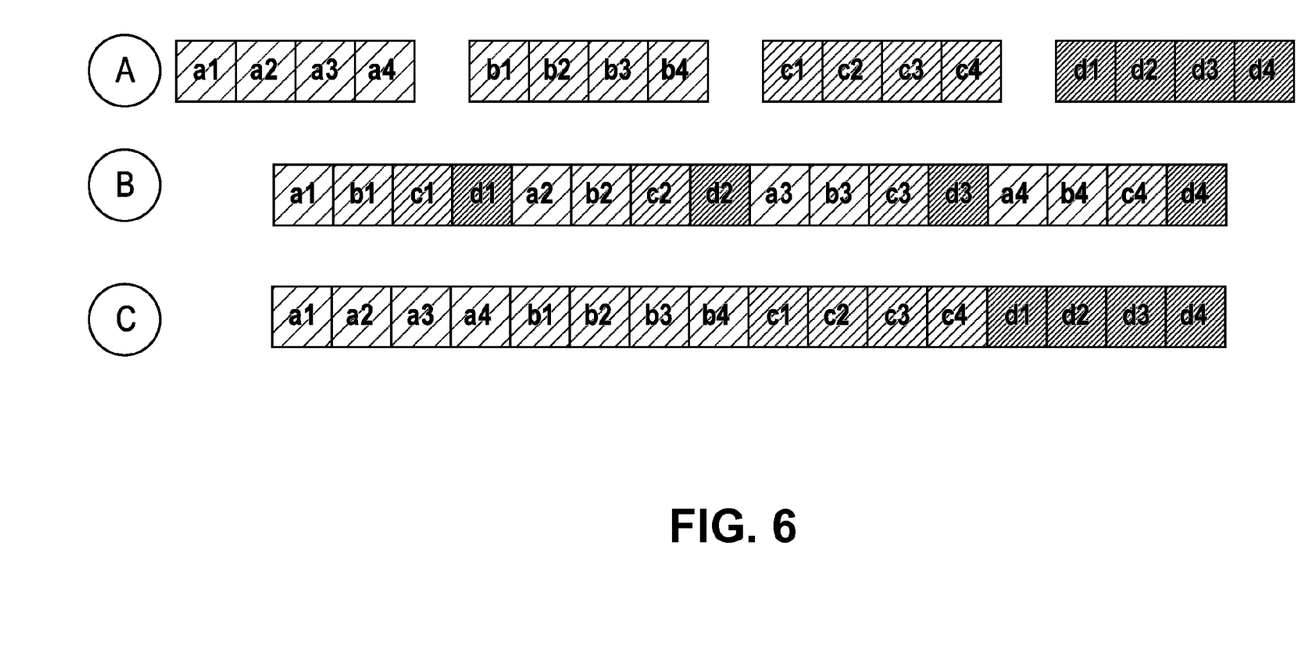
FIG. 6 is an illustration of post-processing of data by an embodiment of a receiving apparatus or system.

In some embodiments, a merged stream can be post-processed to utilize the data of the stream, for example by moving pixel data around in each line to create tiled views of the multiple camera images. FIG. 6 is an illustration of post-processing of data by an embodiment of a receiving apparatus or system. In this illustration, Row A illustrates four original streams from cameras 'a', 'b', 'c' and 'd'. Four pixels from one line of each image are shown, indexed 1, 2, 3, and 4 for each stream.

In row B, the pixels are merged into a pixel repeated stream on a single cable by an embodiment of a merging apparatus, system, or method, with pixel #1 from each of the four stream occupying the first four periods in the active data line, and continuing through each following pixel. In an operation, this combined stream arrives at a display processor.

In some embodiments, logic in the display processor is operable to swizzle the data sequence within one line time, without adding periods, thereby showing image A at the left margin, followed by a coherent image B, image C and image D across the screen, without borders or missing pixels. In some embodiments, a scaler in the display logic may be used to convert the N*M pixels per line (where N is the number of cameras, and M is the number of original pixels in each camera's active line time), into the proper number of pixels for the active line time of the display's resolution.

Figure 7:
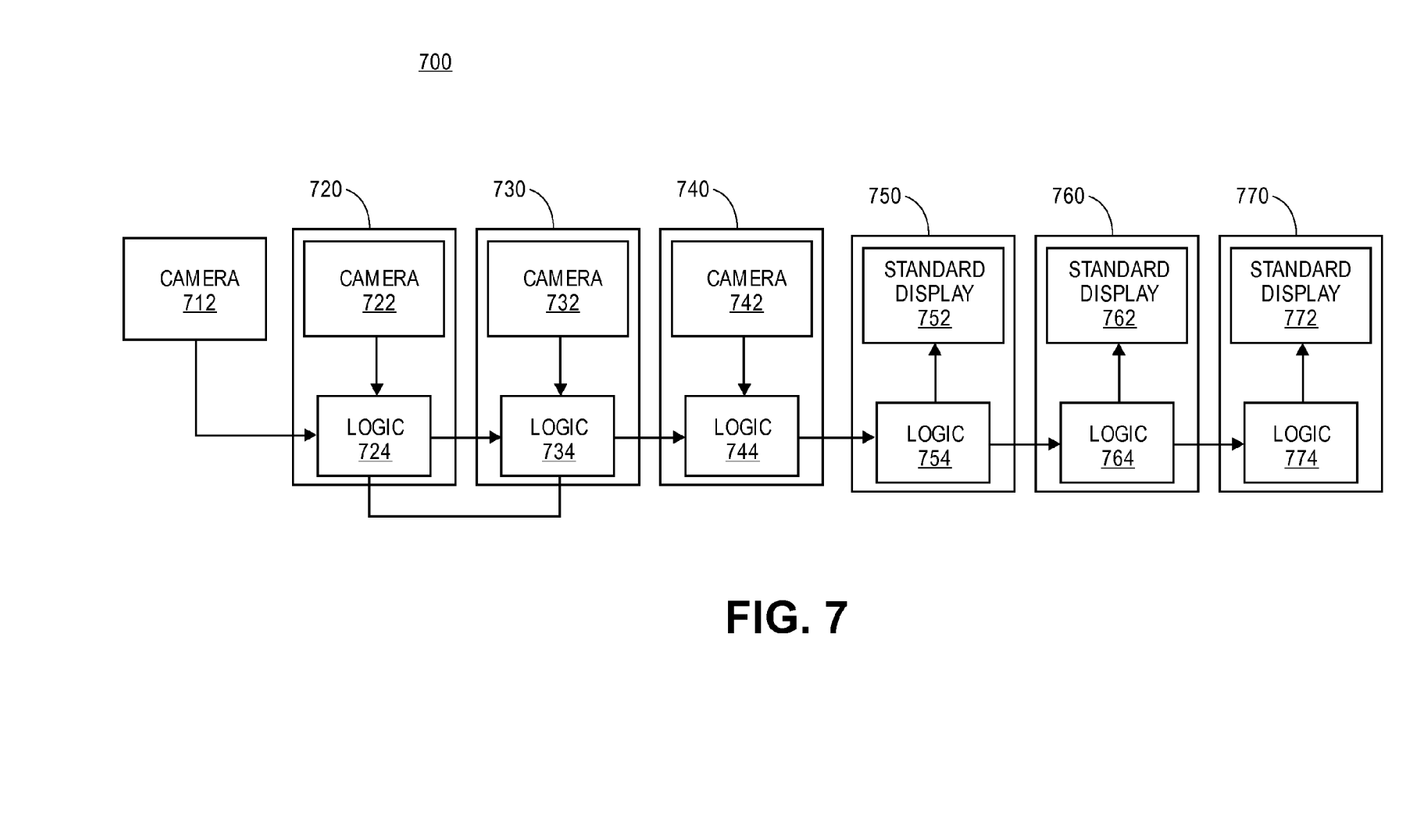
FIG. 7 is an illustration of an apparatus or system including multiple data sources and displays.

FIG. 7 is an illustration of an apparatus or system 700 including multiple data sources and displays. In this illustration, a first camera 712 may provide data to a first merging stage 720 including camera 722 and merging logic 724, where merging logic 724 provides for the merging of data of camera 712 and camera 722 using the elements shown in FIG. 1 and described above. Additional stages may provide for additional merging of data, such as a second merging stage 730 including camera 732 and merging logic 734, and a third merging stage 740 including camera 742 and merging logic 744.

In some embodiments, a last merging stage 740 is coupled with a first display stage 750, stage 750 including display logic 754 and display 752. Addition display stages may follow the first display stage, such as a second display stage 760 including display logic 764 and display 762, and a third display stage 770 including display logic 774 and display 772.

FIG. 7 illustrates only 3 displays for 4 streams. In some embodiments, no central controller is included, where each display's logic is operable to find the appropriate original stream data and convert the data back into a compliant HDMI stream to send to a standard display. In some embodiments, selection of the stream to display may be made by the user, and any of the displays can show any original stream.

Figure 8:
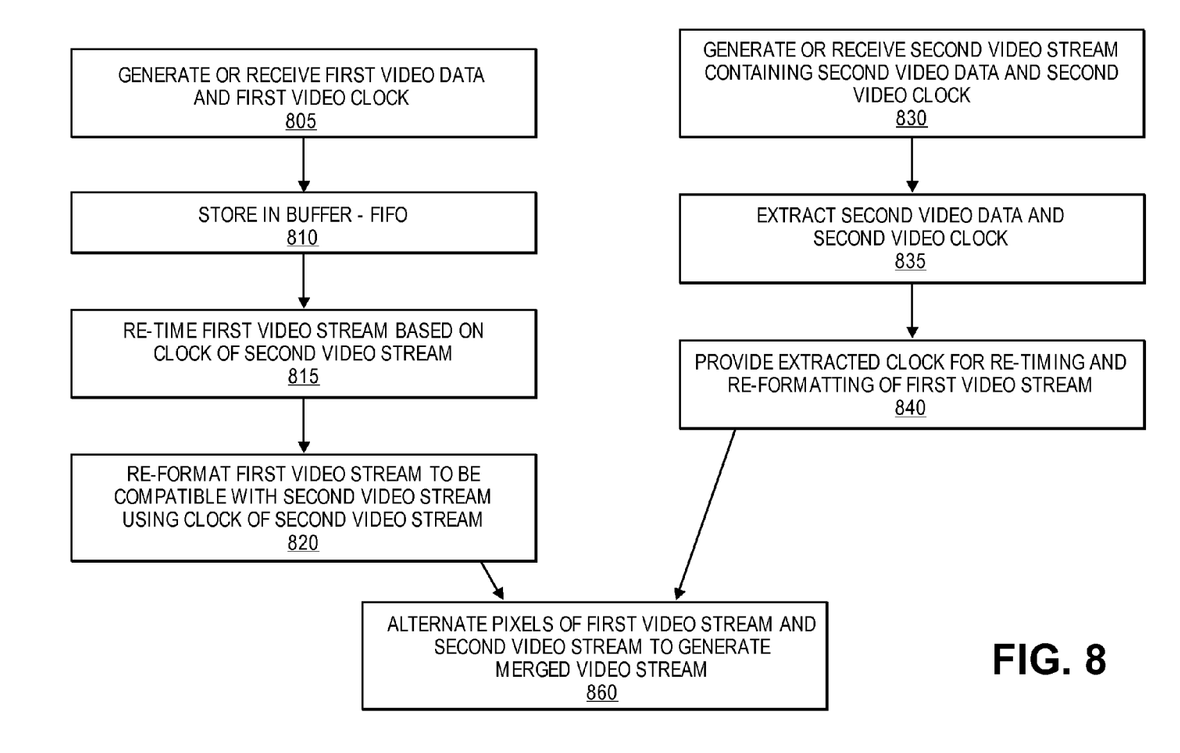
FIG. 8 is a flowchart to illustrate an embodiment of a method for merging of video data streams using pixel repetition bandwidth.

FIG. 8 is a flowchart to illustrate an embodiment of a method for merging of video data streams using pixel repetition bandwidth. In some embodiments, operations regarding a first video data stream overlap at least in part operations regarding a second video data stream. In some embodiments, an apparatus or system may generate or receive first video data and a first video clock signal of the first video data stream 805, where the first video data and first video clock may be stored in a buffer or other memory, which may include a FIFO memory 810, such as FIFO 110 illustrated in FIG. 1.

In some embodiments, the apparatus or system may further generate or receive the second video data stream containing second video data and a second video clock 830, and may provide for extracting the second video data and the second video clock from the second video data stream 835. In some embodiments, the apparatus is to provide the extracted video clock for re-timing and re-formatting the first video data stream 840.

In some embodiments, the apparatus or system is to re-time the first video data stream based on the extracted video clock of the second video data stream 815, and to re-format the first video data stream to compatible with the second video data stream using the video clock of the second video data stream 820.

In some embodiments, the apparatus or system is to alternate pixel data of the first video data stream and the second video data stream to generate a merged or combined video stream. In some embodiments, the pixel state of the first video stream and the second video stream is alternated in the video data period of a line of data. In some embodiments, the merging of the first and second video data streams is accomplished without requiring replication of control structures such as guard bands or preambles for the video data streams.

Figure 9:
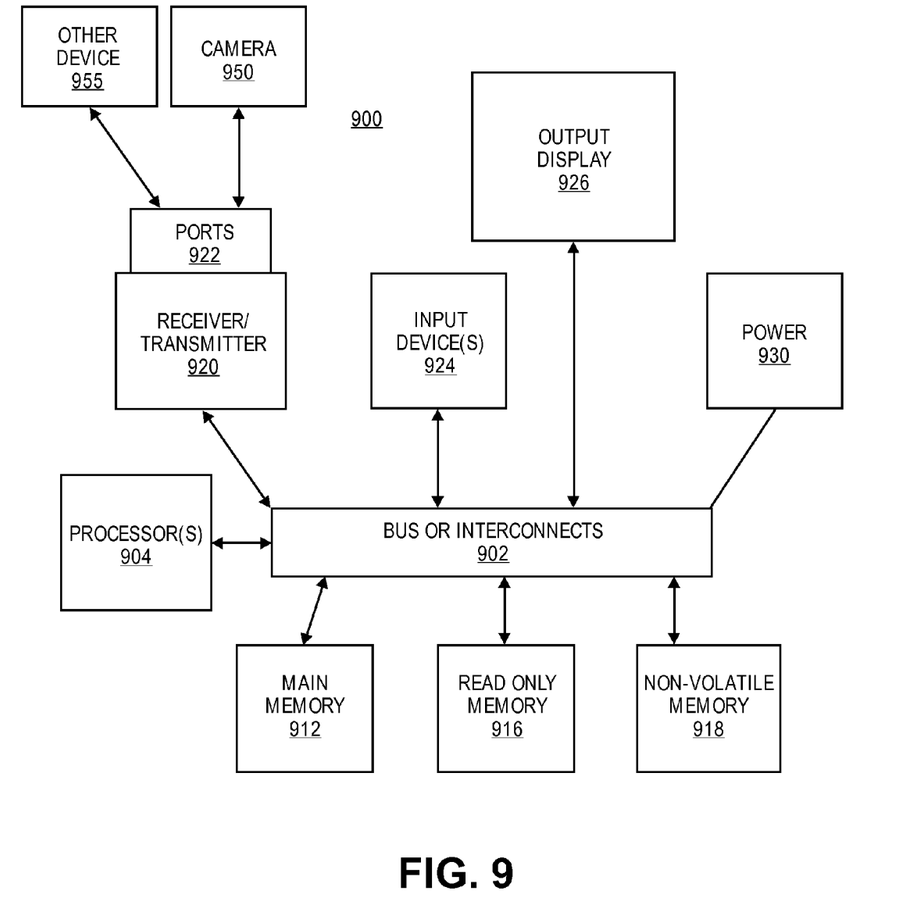
FIG. 9 is an illustration of an apparatus or system for merging video data using pixel repetition bandwidth or for processing of a merged data stream including data of multiple video data streams.

FIG. 9 is an illustration of an apparatus or system for merging video data using pixel repetition bandwidth or for processing of a merged data stream including data of multiple video data streams. In some embodiments, the apparatus or system provides for the merging of one or more video data streams using pixel repetition bandwidth. In some embodiments, the apparatus or system provides for separating data of a merged video data stream into the original video data streams.

In some embodiments, an apparatus or system 900 (referred to here generally as an apparatus) comprises an interconnect or crossbar 902 or other communication means for transmission of data. The apparatus 900 may include a processing means such as one or more processors 904 coupled with the interconnect 902 for processing information. The processors 904 may comprise one or more physical processors and one or more logical processors. The interconnect 902 is illustrated as a single interconnect for simplicity, but may represent multiple different interconnects or buses and the component connections to such interconnects may vary. The interconnect 902 shown in FIG. 9 is an abstraction that represents any one or more separate physical buses, point-to-point connections, or both connected by appropriate bridges, adapters, or controllers.

In some embodiments, the apparatus 900 further comprises a random access memory (RAM) or other dynamic storage device or element as a main memory 912 for storing information and instructions to be executed by the processors 904. In some embodiments, main memory may include active storage of applications including a browser application for using in network browsing activities by a user of the apparatus 900. In some embodiments, memory of the apparatus may include certain registers or other special purpose memory.

The apparatus 900 also may comprise a read only memory (ROM) 916 or other static storage device for storing static information and instructions for the processors 904. The apparatus 900 may include one or more non-volatile memory elements 918 for the storage of certain elements, including, for example, flash memory and a hard disk or solid-state drive.

One or more transmitters or receivers 920 may also be coupled to the interconnect 902. In some embodiments, the receivers or transmitters 920 may include one or more ports 922 for the connection of other apparatuses, such as the illustrated 950. For example, a camera 950 or other device 955 may be coupled to a port of the one or more ports 922. In some embodiments, the camera 950 may generate a video data stream, wherein the apparatus is operable to combine the video data stream with another video data stream using pixel repetition bandwidth to generate a merged data stream, such as illustrated in FIG. 1 and described above. In some embodiments, the other device 955 may generate a merged data stream and the apparatus 900 may operate to separate data of the merged data stream into multiple constituent video data streams, as described above.

The apparatus 900 may also be coupled via the interconnect 902 to an output display 926. In some embodiments, the display 926 may include a liquid crystal display (LCD) or any other display technology, for displaying information or content to a user, including three-dimensional (3D) displays. In some environments, the display 926 may include a touchscreen that is also utilized as at least a part of an input device. In some environments, the display 926 may be or may include an audio device, such as a speaker for providing audio information.

The apparatus 900 may also comprise a power device or apparatus 930, which may comprise a power supply, a battery, a solar cell, a fuel cell, or other system or device for providing or generating power. The power provided by the power device or system 930 may be distributed as required to elements of the apparatus 900.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable non-transitory storage medium having stored thereon computer program instructions, which may be used to program a computer (or other electronic devices) to perform a process according to the present invention. The computer-readable storage medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

In some embodiments, an apparatus includes a buffer to receive pixel data of a first video data stream and a clock of the first video data stream; and a multiplexer to remove pixel repetition of a second video data stream and combine the pixel data of the first video data stream with pixel data of the second video data stream to generate a merged data stream, the multiplexer to alternate between the pixel data of the first video data stream and the pixel data of the second video data stream in the merged data stream. In some embodiments, the merged data stream includes pixel data of the first video data stream and pixel data of the second video data stream in a line of data, wherein a control structure identifies the pixel data of the first video data stream and the pixel data of the second video data stream.

In some embodiments, the control structure includes identification of the position of the pixel data of the first video data stream and the pixel data of the second video data stream in the line of data. In some embodiments, the control structure includes an InfoFrame.

In some embodiments, the apparatus is to combine the first video data stream and the second video data stream into the merged data stream without repetition of a guard band or preamble.

In some embodiments, the multiplexer is further to remove pixel repetition of the first video data stream in combining the pixel data of the first video data stream with the pixel data of the second video data stream to generate the merged data stream.

In some embodiments, the apparatus further includes an extraction component to extract the pixel data of the second video data stream and a clock of the second video data stream from the second video data stream. In some embodiments, the buffer is to re-time the pixel data of the first video data stream based on the clock of the second video data stream.

In some embodiments, the apparatus further includes a formatter, the formatter to reformat the first video data stream to be compatible with the second video data stream. In some embodiments, the formatting of the first video data stream includes shifting of data island data of the first video data stream to create space for data island data of the second video data stream.

In some embodiments, the buffer of the apparatus is a First In First Out (FIFO) memory buffer.

In some embodiments, the first video data stream includes video from a first camera and the second video data stream includes video from a second camera. In some embodiments, the apparatus is at least a portion of a surveillance system.

In some embodiments, the apparatus is at least a portion of a video switch, the video switch to combine a plurality of video data streams into the merged data stream for transport over a single line. In some embodiments, the video switch is to select a preamble code for the merged data stream based on a destination of a video data stream or an identity of an originator of the video data stream.

In some embodiments, a method includes storing pixel data and a clock of a first video data stream in a buffer; removing pixel repetition of a second video data stream; and generating a merged data stream by combining the pixel data of the first video data stream with pixel data of the second video data stream. In some embodiments, generating the merged data stream includes alternating between the pixel data of the first video data stream and the pixel data of the second video data stream in the merged data stream, and wherein generating the merged data stream includes placing pixel data of the first video data stream and pixel data of the second video data stream in a single line of data, a control structure identifying the pixel data of the first video data stream and the pixel data of the second video data stream.

In some embodiments, identifying the pixel data of the first video data stream and the pixel data of the second video data stream includes identifying positions of the pixel data of the first video data stream and the pixel data of the second video data stream in a line of data.

In some embodiments, the generation of the merged data stream occurs without replicating a preamble or guard band.

In some embodiments, the method further includes extracting the pixel data of the second video data stream and a clock of the second video data stream from the second video data stream. In some embodiments, the method further includes re-timing the pixel data of the first video data stream based on the clock of the second video data stream.

In some embodiments, the method further includes reformatting the first video data stream to be compatible with the second video data stream. In some embodiments, the formatting of the first video data stream includes shifting of data island data of the first video data stream to create space for data island data of the second video data stream.

In some embodiments, the buffer is a First In First Out (FIFO) memory buffer.

In some embodiments, an apparatus includes a receiver to receive a merged data stream, the merged data stream including pixel data of a plurality of video data streams in a line of data, the merged data stream alternating between the pixel data of each of the plurality of video data streams, wherein a control structure in the merged data stream identifies positions of the pixel data of each of the plurality of video data streams in a line of data; and a processor to separate pixel data of the merged data stream into a plurality of corresponding data streams based at least in part on the identified positions of each pixel data of each of the video data streams in a line of data.

In some embodiments, the control structure includes an InfoFrame. In some embodiments, the merged data stream combines video data streams without repetition of a guard band or preamble.

In some embodiments, the control structure includes a zero or null value for at least one position in the line of data. In some embodiments, the processor is to ignore the zero or null value of the line of data.

In some embodiments, the processor is to separate data islands of the merged data stream into the plurality of video data streams.

In some embodiments, the apparatus is to provide the plurality of video data streams to a plurality of separate video monitors.

In some embodiments, a method includes receiving a merged data stream, the merged data stream including pixel data of a plurality of video data streams in a line of data, the merged data stream alternating between the pixel data of each of the plurality of video data streams, wherein a control structure in the merged data stream identifies positions of the pixel data of each of the plurality of video data streams in a line of data; and separating pixel data of the merged data stream into a plurality of corresponding video data streams based at least in part on the identified positions of each pixel data of each of the video data streams in a line of data.

In some embodiments, the control structure includes a zero or null value for at least one position in the line of data, and the method further includes ignoring the zero or null value of the line of data.

In some embodiments, the method further includes separating data islands of the merged data stream into the plurality of video data streams.

In some embodiments, a non-transitory computer-readable storage medium having stored thereon data representing sequences of instructions that, when executed by a processor, cause the processor to perform operations including storing pixel data and a clock of a first video data stream in a buffer; removing pixel repetition of a second video data stream; and generating a merged data stream by combining the pixel data of the first video data stream with pixel data of the second video data stream. In some embodiments, generating the merged data stream includes alternating between the pixel data of the first video data stream and the pixel data of the second video data stream in the merged data stream. In some embodiments, generating the merged data stream includes placing pixel data of the first video data stream and pixel data of the second video data stream in a single line of data, a control structure identifying the pixel data of the first video data stream and the pixel data of the second video data stream.

In some embodiments, a non-transitory computer-readable storage medium having stored thereon data representing sequences of instructions that, when executed by a processor, cause the processor to perform operations comprising receiving a merged data stream, the merged data stream including pixel data of a plurality of video data streams in a line of data, the merged data stream alternating between the pixel data of each of the plurality of video data streams, wherein a control structure in the merged data stream identifies positions of the pixel data of each of the plurality of video data streams in a line of data; and separating pixel data of the merged data stream into a plurality of corresponding data streams based at least in part on the identified positions of each pixel data of each of the video data streams in a line of data.

What is claimed is:

1. An apparatus comprising:
    a buffer to receive pixel data of a first video data stream and a clock of the first video data stream; and
    a multiplexer to combine the pixel data of the first video data stream with pixel data of a second video data stream to generate a merged data stream and to remove repeated pixels of the second video data stream when combining the pixel data of the first video data stream and the pixel data of the second video data stream, the pixel data of the first video data stream and the pixel data of the second video data stream alternating in the merged data stream;
    wherein the merged data stream includes the pixel data of the first video data stream and the pixel data of the second video data stream in a line of a frame and the merged data stream includes control structure data,
    wherein the control structure data of the merged data stream includes identification of at least one first position of the pixel data of the first video data stream in the line of the frame and identification of at least one second position of the pixel data of the second video data stream in the line of the frame.

2. The apparatus of claim 1, wherein the second video data stream includes pixel values of an original video stream and repeated copies of the pixel values corresponding to a repeated version of the original video stream, and the multiplexer removes the repeated pixels of the second video data stream by removing the repeated copies of the pixel values corresponding to the repeated version of the original video stream.

3. The apparatus of claim 1, wherein the control structure data of the merged data stream includes an InfoFrame.

4. The apparatus of claim 1, wherein the first video data stream and the second video data stream are combined into the merged data stream without replication of a guard band or preamble.

5. The apparatus of claim 1, wherein the multiplexer obtains the pixel data of the first video by removing repeated pixels of the first video data stream when combining the pixel data of the first video data stream with the pixel data of the second video data stream to generate the merged data stream.

6. The apparatus of claim 1, further comprising an extraction component to extract the pixel data of the second video data stream and a clock of the second video data stream from the second video data stream.

7. The apparatus of claim 6, wherein the buffer is to re-time the pixel data of the first video data stream based on the clock of the second video data stream.

8. The apparatus of claim 1, further comprising a formatter that reformats the first video data stream to be compatible with the second video data stream.

9. The apparatus of claim 8, wherein the formatting of the first video data stream includes shifting data island data of the first video data stream to create space for data island data of the second video data stream.

10. The apparatus of claim 1, wherein the buffer is a First In First Out (FIFO) memory buffer.

11. The apparatus of claim 1, wherein the first video data stream includes video from a first camera and the second video data stream includes video from a second camera.

12. The apparatus of claim 11, wherein the apparatus is at least a portion of a surveillance system.

13. The apparatus of claim 1, wherein the apparatus is at least a portion of a video switch, the video switch combining a plurality of video data streams into the merged data stream for transport over a single line.

14. The apparatus of claim 13, wherein the video switch selects a preamble code for the merged data stream based on a destination of a video data stream or an identity of an originator of the video data stream.

15. A method comprising:
storing pixel data and a clock of a first video data stream in a buffer;
removing repeated pixels of a second video data stream; and
generating a merged data stream by combining the pixel data of the first video data stream with pixel data of the second video data stream, the merged data stream comprising control structure data;
wherein the pixel data of the first video data stream and the pixel data of the second video data stream alternate in the merged data stream,
the pixel data of the first video data stream and the pixel data of the second video data stream are placed in a line of a frame, and
the control structure data of the merged data stream includes identification of at least one first position of the pixel data of the first video data stream in the line of frame and identification of at least one second position of the pixel data of the second video data stream in the line of the frame.

16. The method of claim 15, wherein the merged data stream combines the first video data stream and the second video data stream without replicating a preamble or guard band.

17. The method of claim 15, further comprising extracting the pixel data of the second video data stream and a clock of the second video data stream from the second video data stream.

18. The method of claim 17, further comprising re-timing the pixel data of the first video data stream based on the clock of the second video data stream.

19. The method of claim 15, further comprising reformatting the first video data stream to be compatible with the second video data stream.

20. The method of claim 19, wherein the formatting of the first video data stream includes shifting data island data of the first video data stream to create space for data island data of the second video data stream.

21. The method of claim 15, wherein the buffer is a First In First Out (FIFO) memory buffer.

22. An apparatus comprising:
a receiver to receive a merged data stream, the merged data stream including pixel data of a plurality of video data streams in a line of a frame and control structure data, the pixel data of each of the plurality of video data streams alternating in the merged data stream, wherein the control structure data of the merged data stream includes identification of at least one position of the pixel data of each of the plurality of video data streams in the line of the frame; and
a processor to separate the merged data stream into the plurality of video data streams based at least in part on the identification of the at least one position of the pixel data of each of the plurality of video data streams in the line of the frame.

23. The apparatus of claim 22, wherein the control structure data of the merged data stream includes an InfoFrame.

24. The apparatus of claim 22, wherein the merged data stream combines the plurality of video data streams without repetition of a guard band or preamble.

25. The apparatus of claim 22, wherein the control structure data of the merged data stream includes a zero or null value for at least one position in the line of the frame.

26. The apparatus of claim 25, wherein the processor ignores the zero or null value in the line of the frame.

27. The apparatus of claim 22, wherein the processor separates data islands of the merged data stream into the plurality of video data streams.

28. The apparatus of claim 22, wherein the apparatus provides the plurality of video data streams to a plurality of separate video monitors.

29. A method comprising:
receiving a merged data stream, the merged data stream including pixel data of a plurality of video data streams in a line of a frame and control structure data, the pixel data of each of the plurality of video data streams alternating in the merged data stream, wherein the control structure data of the merged data stream includes identification of at least one position of the pixel data of each of the plurality of video data streams in the line of the frame; and
separating the merged data stream into the plurality of video data streams based at least in part on the identification of the at least one position of the pixel data of each of the plurality of video data streams in the line of the frame.

30. The method of claim 29, wherein the control structure data of the merged data stream includes a zero or null value for at least one position in the line of the frame, further comprising ignoring the zero or null value of the line of the frame.

31. The method of claim 29, further comprising separating data islands of the merged data stream into the plurality of video data streams.

32. A non-transitory computer-readable storage medium having stored thereon data representing sequences of instructions that, when executed by a processor, cause the processor to perform operations comprising:
- storing pixel data and a clock of a first video data stream in a buffer;
- removing repeated pixels of a second video data stream; and
- generating a merged data stream by combining the pixel data of the first video data stream with pixel data of the second video data stream in a line of a frame, the merged data stream comprising control structure data;
- wherein the pixel data of the first video data stream and the pixel data of the second video data stream alternate in the merged data stream,
- the pixel data of the first video data stream and the pixel data of the second video data stream are placed in a line of a frame, and
- the control structure data of the merged data stream includes identification of at least one first position of the pixel data of the first video data stream in the line of the frame and includes identification of at least one second position of the pixel data of the second video data stream in the line of the frame.

33. A non-transitory computer-readable storage medium having stored thereon data representing sequences of instructions that, when executed by a processor, cause the processor to perform operations comprising:
- receiving a merged data stream, the merged data stream including pixel data of a plurality of video data streams in a line of a frame and control structure data, the pixel data of each of the plurality of video data streams alternating in the merged data stream, wherein the control structure data of the merged data stream includes identification of at least one position of the pixel data of each of the plurality of video data streams in the line of the frame; and
- separating the merged data stream into the plurality of video data streams based at least in part on the identification of the at least one position of the pixel data of each of the plurality of video data streams in the line of the frame.

* * * * *